(12) United States Patent
Reddy et al.

(10) Patent No.: US 7,231,220 B2
(45) Date of Patent: Jun. 12, 2007

(54) LOCATION BASED METHOD AND SYSTEM FOR WIRELESS MOBILE UNIT COMMUNICATION

(75) Inventors: Gautam G. Reddy, King of Prussia, PA (US); Prabhakar R. Chitrapu, Blue Bell, PA (US); Leonid Kazakevich, Plainview, NY (US); Teresa Joanne Hunkeler, Montreal (CA); Arty Chandra, Hempstead, NY (US)

(73) Assignee: Interdigital Technology Corporation, Wilmington, DE (US)

( * ) Notice: Subject to any disclaimer, the term of this patent is extended or adjusted under 35 U.S.C. 154(b) by 206 days.

(21) Appl. No.: 10/675,638

(22) Filed: Sep. 29, 2003

(65) Prior Publication Data

US 2004/0147254 A1    Jul. 29, 2004

Related U.S. Application Data

(60) Provisional application No. 60/415,281, filed on Oct. 1, 2002.

(51) Int. Cl.
*H04Q 7/20* (2006.01)

(52) U.S. Cl. .................. 455/457; 455/456.1; 455/456.2; 455/456.3; 455/115.3

(58) Field of Classification Search ............ 455/422.1, 455/421, 404.2, 456.1, 567, 433, 456.3, 457, 455/456.2; 701/200, 201, 212; 340/990–993
See application file for complete search history.

(56) References Cited

U.S. PATENT DOCUMENTS

| | | | |
|---|---|---|---|
| 5,231,634 A | 7/1993 | Giles et al. | |
| 5,627,549 A * | 5/1997 | Park | ......................... 701/300 |
| 5,903,618 A | 5/1999 | Miyake et al. | |
| 6,014,568 A | 1/2000 | Alperovich et al. | |
| 6,026,304 A | 2/2000 | Hilsenrath et al. | |
| 6,049,711 A * | 4/2000 | Ben-Yehezkel et al. | .. 455/414.3 |
| 6,154,172 A * | 11/2000 | Piccionelli et al. | ...... 342/357.1 |
| 6,167,268 A | 12/2000 | Souissi et al. | |
| 6,208,861 B1 | 3/2001 | Suzuki | |
| 6,463,289 B1 * | 10/2002 | Havinis et al. | .......... 455/456.4 |
| 6,553,233 B1 | 4/2003 | Lee et al. | |
| 6,560,642 B1 | 5/2003 | Ravi et al. | |

(Continued)

FOREIGN PATENT DOCUMENTS

CN       1068691       2/1993

(Continued)

*Primary Examiner*—Duc M. Nguyen
*Assistant Examiner*—Dai Phuong
(74) *Attorney, Agent, or Firm*—Volpe & Koenig, P.C.

(57) ABSTRACT

A method and system for wireless mobile unit communication within a wireless network having geographic areas for preferred communication usage is provided. An estimated geographic location of a mobile unit is determined. The mobile unit is provided with relative position data of at least one preferred communication area relative to the determined mobile unit estimated location. The mobile unit is then relocated to a preferred communication area based on the relative position data. Preferably, a request for a pre-designated preferred communication area location is initiated by a mobile unit transmission and received by a network base station. The mobile unit can be equipped with a global positioning system (GPS) to determine the mobile unit's estimated location. Transmission of estimated location data can be dependent upon whether the mobile unit or the network calculates relative position data.

23 Claims, 3 Drawing Sheets

U.S. PATENT DOCUMENTS

| | | |
|---|---|---|
| 6,804,532 B1 | 10/2004 | Moon et al. |
| 2002/0059453 A1 | 5/2002 | Erikkson et al. |
| 2002/0071413 A1 | 6/2002 | Choi |
| 2002/0090953 A1* | 7/2002 | Aburai et al. ............... 455/456 |
| 2002/0128000 A1 | 9/2002 | do Nascimento, Jr. |
| 2002/0181510 A1 | 12/2002 | Abrol et al. |
| 2002/0191575 A1* | 12/2002 | Kalavade et al. ........... 370/338 |
| 2003/0008644 A1* | 1/2003 | Akhterzzaman et al. .... 455/418 |
| 2003/0032434 A1 | 2/2003 | Willner et al. |
| 2003/0078707 A1* | 4/2003 | Shioda et al. ................. 701/22 |
| 2003/0109284 A1* | 6/2003 | Akerberg et al. ........... 455/561 |
| 2003/0142652 A1 | 7/2003 | Ting et al. |
| 2003/0174682 A1 | 9/2003 | Barker, Jr. |
| 2003/0235175 A1 | 12/2003 | Naghian et al. |
| 2004/0004951 A1 | 1/2004 | Zuniga et al. |
| 2004/0053602 A1 | 3/2004 | Wurzburg |
| 2004/0203638 A1 | 10/2004 | Chan et al. |
| 2004/0204071 A1 | 10/2004 | Bahl et al. |
| 2004/0220995 A1* | 11/2004 | Tsutsumi .................... 709/200 |
| 2004/0224682 A1* | 11/2004 | Kang ......................... 455/433 |
| 2005/0181795 A1* | 8/2005 | Mark et al. .................. 455/436 |

FOREIGN PATENT DOCUMENTS

| | | |
|---|---|---|
| CN | 1360798 | 7/2002 |
| CN | 1376001 | 10/2002 |
| CN | 1396784 | 2/2003 |
| EP | 0 963 061 | 12/1999 |
| EP | 1235451 | 8/2002 |
| JP | 7-107031 | 4/1995 |
| JP | P2000-40990 | 6/1999 |
| WO | 98/39936 | 9/1998 |
| WO | 00/54539 | 9/2000 |

* cited by examiner

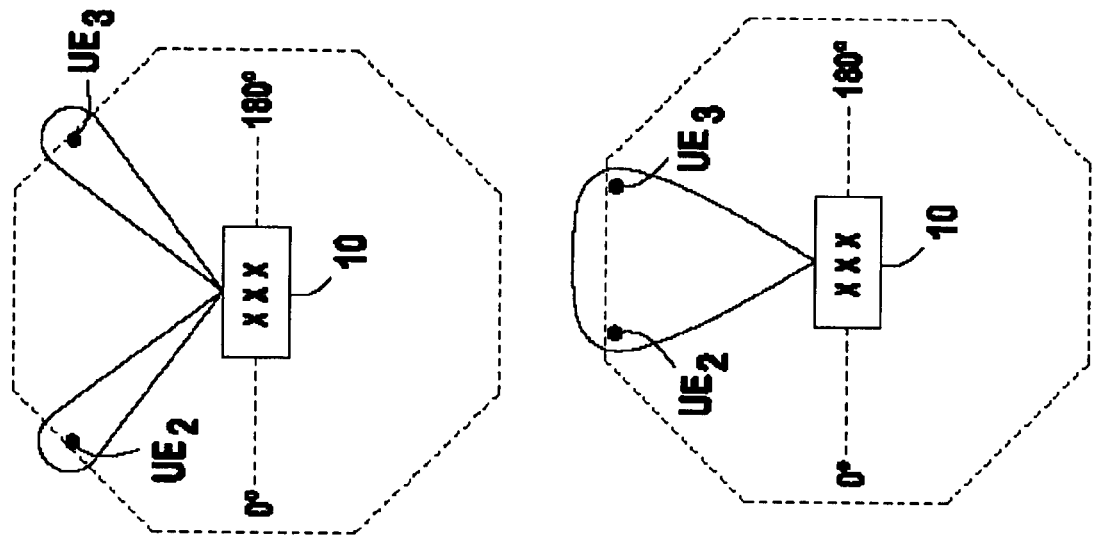
*FIG. 2b (Prior Art)*
*FIG. 2c (Prior Art)*
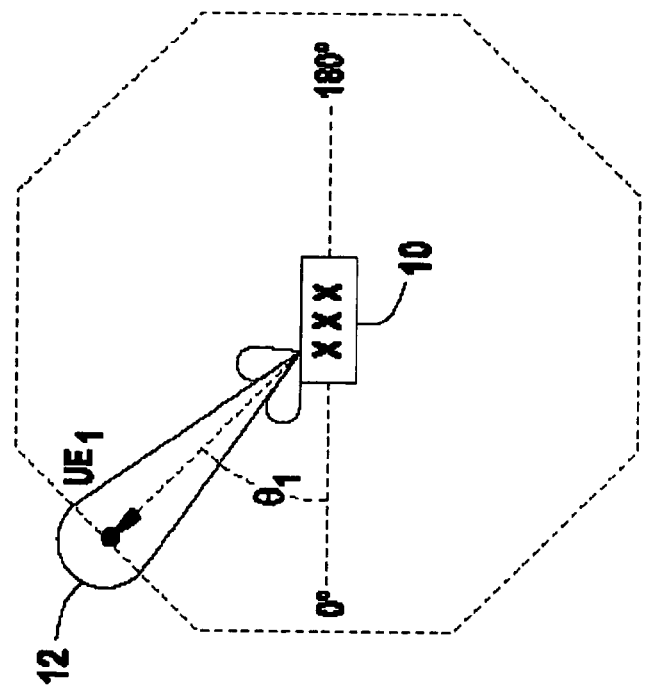
*FIG. 2a (Prior Art)*

LOCATION BASED METHOD AND SYSTEM FOR WIRELESS MOBILE UNIT COMMUNICATION

CROSS REFERENCE TO RELATED APPLICATION(S)

This application claims priority from U.S. Provisional Application No. 60/415,281 filed on Oct. 1, 2002 which is incorporated by reference as if fully set forth herein.

FIELD OF INVENTION

This application relates to a location based method and system for wireless mobile unit communication, and in particular to such systems having geographic areas designated for preferred communication usage, sometimes called hot spots.

BACKGROUND OF THE INVENTION

Wireless communication systems are well known in the art. Generally, such systems comprise communication stations which transmit and receive wireless communication signals between each other. Typically, base stations are provided which are capable of conducting wireless concurrent communications with a plurality of subscriber stations generically known as wireless transmit/receive units (WTRUs), which include mobile units. Generally, the term base station as used herein includes, but is not limited to, a base station, Node B, site controller, access point, or other interfacing device in a wireless environment that provides wireless access to the network with which it is associated. The term WTRU as used herein includes, but is not limited to, a user equipment, mobile station, fixed or mobile subscriber unit, pager, or any other type of device capable of operating in a wireless environment.

WTRUs include personal communication devices, such as phones, video phones, and Internet ready phones that have network connections. In addition, WTRUs include portable personal computing devices, such as PDAs and notebook computers, with wireless modems that have similar network capabilities.

WTRUs that are portable or can otherwise change location are referred to as mobile units. For mobile units, preserving battery life is generally an important consideration in designing both the mobile unit and communication networks in which it operates. There are several ways to achieve the goal of reduced power consumption in a mobile unit. For example, an increase in the number of connecting base stations within a geographic region can translate into decreased power needed for mobile unit communications.

FIG. 1a illustrates a mobile unit 104 in a wireless local area network (WLAN) 106 where a base station 102 is located at the center of the WLAN 106. As the mobile unit 104 travels away from the base station 102, the WTRU 104 and the base station 102 must increase power to ensure the same quality of service (QoS) in their wireless communication.

FIG. 1b illustrates a WLAN 112, a mobile unit 107 and nine base stations 101, 103, 105, 109, 111, 113, 115, and 117. The dense concentration of base stations reduces the distance from the mobile unit 107 to each base station. This allows the mobile units and base stations to use less transmitting power, because of the shorter distances. Such dense concentration of base stations reduces power requirements due to transmission distance, but at a cost of increased interference. The increase in interference may require the mobile units and base stations to increase transmitting power, thereby nullifying the power conservation and attendant battery life preservation.

A system can reduce interference by determining the location of each mobile unit and focusing a base station's antenna beam pattern at each mobile unit's direction. Focusing an antenna's beam pattern is also known as beam forming.

FIGS. 2a–c illustrate antenna radiation patterns in a system using beam forming such as disclosed in U.S. patent application Ser. No. 10/305,595 owned by the assignee of the present application. FIG. 2a illustrates a base station 10 with an antenna pattern 12 that concentrates radio frequency energy to and from a mobile unit $UE_1$ based on the mobile unit's relative location.

Beam forming can be selectively utilized in the servicing of multiple wireless concurrent communications with multiple beams or a single beam which is controlled based upon factors such as location and relative interference. FIGS. 2b and 2c illustrate two different scenarios of base station 10 concentrating radio frequency energy to and from mobile units $UE_2$ and $UE_3$ based on different mobile unit relative locations.

To utilize beam forming, the location of the mobile unit must first be determined. Location determination can be achieved by any of a variety of known methods. For example, the mobile unit can determine its own location using a built-in global positioning system (GPS) receiver and report its location to the network. A network can also determine the location of a mobile unit using AOA (Angle of Arrival), TDOA (Time Difference of Arrival), or Doppler techniques. A hybrid method can be used where a network assists a mobile unit to determine its own location. Generally, each method produces an estimate of the relative mobile unit location with an associated margin of estimation error.

There are many ways for service providers to offer and control network access. For example, a popular wireless local area network protocol with one or more WLAN access points may be built on the IEEE 802.11b standard. In some such networks, selected WLAN service may be provided in relatively small, well defined geographic areas known as "hot spots." These areas allow users the ability to go "on-line" with their mobile units and access a wireless network.

"Hot Spot" WLAN communication systems can advantageously be deployed in many locations, such as airports, coffee shops, and libraries. Access to these networks is typically achieved through a user authentication procedure. As the IEEE 802 families of standards are always evolving, such procedures are not yet fully standardized in the WLAN technology area.

Applicants have recognized a problem with "hot spot" communications in that a user may have trouble locating where the hot spot communication areas are, more particularly where the user should be physically located to obtain the best QoS within the WLAN.

SUMMARY

The present invention provides a method and a system for wireless mobile unit communication within a wireless network having geographic areas designated or determined for preferred communication usage. In some applications, specific areas are pre-designated as "hot spots". Alternatively, a preferred communication area can be determined relative to the signal quality or other communication parameter of an on going communication with a mobile unit.

The method includes determining an estimated geographic location of a mobile unit. The mobile unit is provided with relative position data of at least one preferred communication area relative to the determined mobile unit estimated location. The mobile unit is then relocated to such a preferred communication area based on the relative position data.

Preferably, a request for a hot spot area location is initiated by a mobile unit transmission and received by a network base station. Where the mobile unit is equipped with a global positioning system (GPS), the mobile unit's estimated location is determined by using the mobile unit's global positioning system (GPS). The mobile unit request transmission may then include current mobile unit estimated location data, and the network base station transmits to the mobile unit relative position data that is determined by the network based on the current mobile unit estimated location data. Preferably, relative position data transmitted by the network base station to the mobile unit is determined by the network based on the current mobile unit estimated location data and dynamic data of hot spot area usage, such as the number of wireless communications currently being conducted.

An alternative is where a current mobile unit estimated location is determined by the wireless network. A location estimate is derived using conventional analysis of data related to physical properties of a mobile unit transmission received by one or more network base stations. One of the network base stations then transmits to the mobile unit relative position data that is entirely determined by the network. The relative position data transmitted by the network base station to the mobile unit may be determined by the network based on the current mobile unit estimated location data and dynamic data of network usage. Accordingly, the relative position data may correspond to a pre-designated hot spot area or simply an area that the network determines will provide the mobile unit with an improved wireless connection.

Where the mobile unit is equipped with a global positioning system (GPS), the mobile unit does not necessarily have to transmit an estimated location to the network. A network base station can transmit to the mobile unit geographic location data of all pre-designated hot spot areas serviced by the base station. The mobile unit's relative position to the hot spots can then be determined by the mobile unit via its GPS.

The network may permit direct mobile unit wireless communications with network base stations and also peer-to-peer wireless communications between mobile units. A request initiated by a mobile unit for reception by a network base station can then be relayed via a different mobile unit located in a hot spot area serviced by the base station.

The network can be configured to monitor mobile unit estimated locations and periodically transmit relative position data of preferred communication areas to the mobile unit. Preferably, such data is determined by the network based on current mobile unit estimated location data and dynamic data of the mobile unit's signal and/or network usage. The network can determine a ranked preference order of preferred communication areas and transmit relative position data a best preferred communication area preference or a series of ranked preferences to the mobile unit.

The geographic hot spot areas are preferably defined by respective sets of geographical coordinates that are stored in a network database. One or more of the data sets are then selectively transmitted from a network base station to provide the mobile unit with relative position data.

A mobile unit for such communication within a wireless network preferably has a transmitter, receiver, and user output device. The transmitter is configured to initiate a request for a preferred communication area location. The receiver is configured to receive geographic location data corresponding to at least one preferred communication area serviced by the network. The user output device alerts a mobile unit user of the relative position of at least one preferred communication area serviced by the network to the mobile unit's estimated location that is either determined by the network or the mobile unit depending upon how the mobile unit is equipped.

The mobile unit may be configured for wireless communication on or more wireless networks including, but not limited to, wireless local area networks (WLANs), time division duplex (TDD) telecommunications systems, and/or frequency division duplex (FDD) telecommunications systems. Accordingly, the mobile unit's transmitter and receiver are configured to utilize the protocols used by the specific systems in which it is intended to be used.

The mobile unit may be equipped with a global positioning system (GPS) that determines an estimated location of the mobile unit. In such case, the transmitter can be configured to transmit a preferred communication location request by transmitting a signal that includes current mobile unit estimated location data and the mobile unit receiver is configured to receive geographic location data corresponding to at least one preferred communication area in the form of relative position data that is determined by the network based on the transmitted mobile unit estimated location data.

Alternatively, the mobile unit location is not transmitted to the network by a GPS equipped mobile unit. The mobile unit's GPS is used to calculate relative position data to preferred communication areas based on geographic location data received in response to a transmitted request that corresponds to at least one preferred communication area serviced by the network.

Where there is no mobile unit GPS, the mobile unit receiver is preferably configured to receive geographic location data corresponding to at least one preferred communication area in the form of relative position data that is based on a mobile unit estimated location determined by the wireless network.

The mobile unit can be configured for direct communication with network base stations and also peer-to-peer wireless communications with other mobile units. In such case, the mobile unit receiver is preferably configured to also receive a response to a transmitted request via a relay from another mobile unit in direct communication with a network base station.

The mobile unit can be configured with a map display to visually display preferred communication areas relative to the estimated mobile unit location. The user output device may include a power use indicator that is active when the mobile unit is physically located in an area where power consumption is relatively high. Such an indicator can be used to trigger a request, manually or automatically, for the relative location of a preferred communication area where power consumption would be lower.

Other objects and advantages of the present invention will be apparent to those skilled in the art from the following detailed description and relate drawings.

BRIEF DESCRIPTION OF THE DRAWINGS

FIGS. 2a–c are example diagrams of antenna radiation patterns in a beam forming system.

DETAILED DESCRIPTION OF THE PREFERRED EMBODIMENTS

Figure 1B:
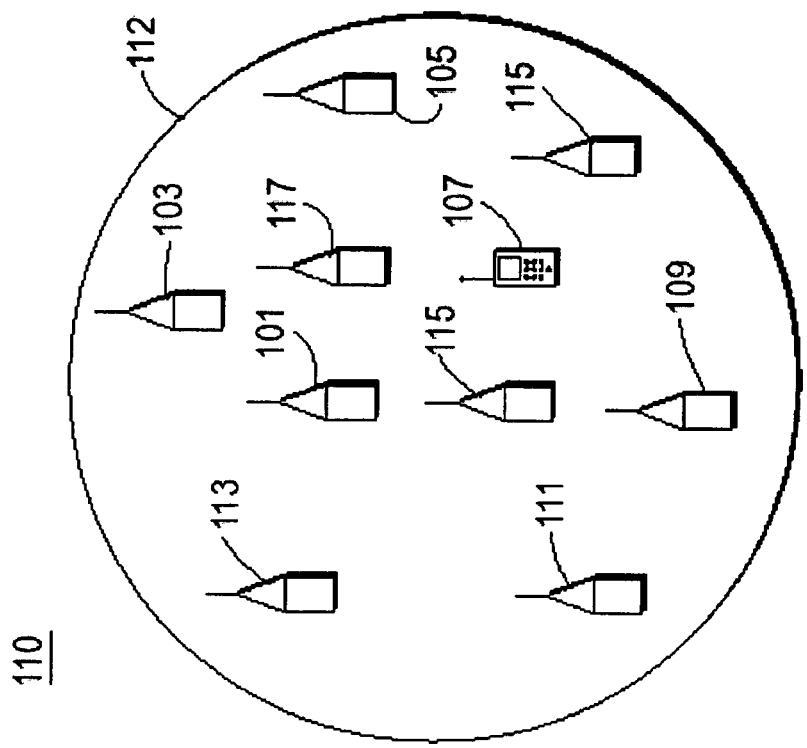
FIG. 1b illustrates a WLAN with multiple base stations.
Figure 1A:
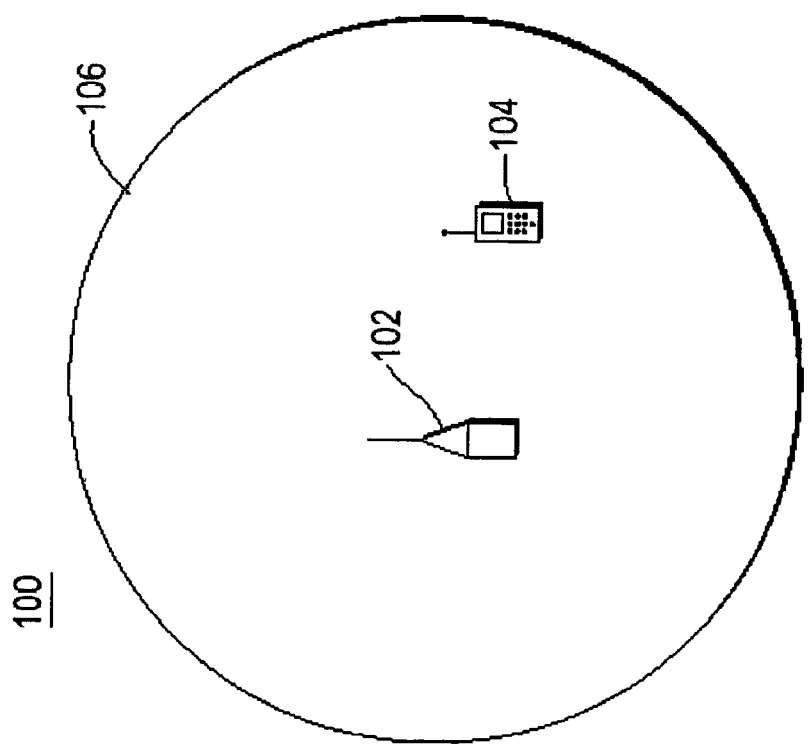
FIG. 1a illustrates a mobile unit in a wireless local area network (WLAN).

The present invention is described with reference to the drawing figures wherein like numerals represent like elements throughout. The terms base station, WTRU, and mobile unit are used in their general sense as described above. The present invention provides a wireless radio access network having one or more networked base stations through which wireless service is provided for mobile units, i.e., mobile WTRUs, as they enter and/or travel through the respective areas of geographic coverage provided by the respective base stations. For reason of simplicity, the invention is in part described as applied to a wireless local area network (WLAN) having base stations, i.e., access points, built on the IEEE 802.11b standard. Preferably, the WLAN has geographic areas pre-designated for preferred communication usage called hot spots. Such networks can be configured for both direct network access by mobile units and also permit peer-to-peer mobile unit communications, sometimes referred to as ad hoc communications. However, the proposed invention is applicable in any wireless system that may be accessed by mobile units. For example, in lieu of or in addition to hot spot areas, a preferred communication area can be determined relative to signal quality or another communication parameter of an on going communication with a mobile unit.

Figure 3:
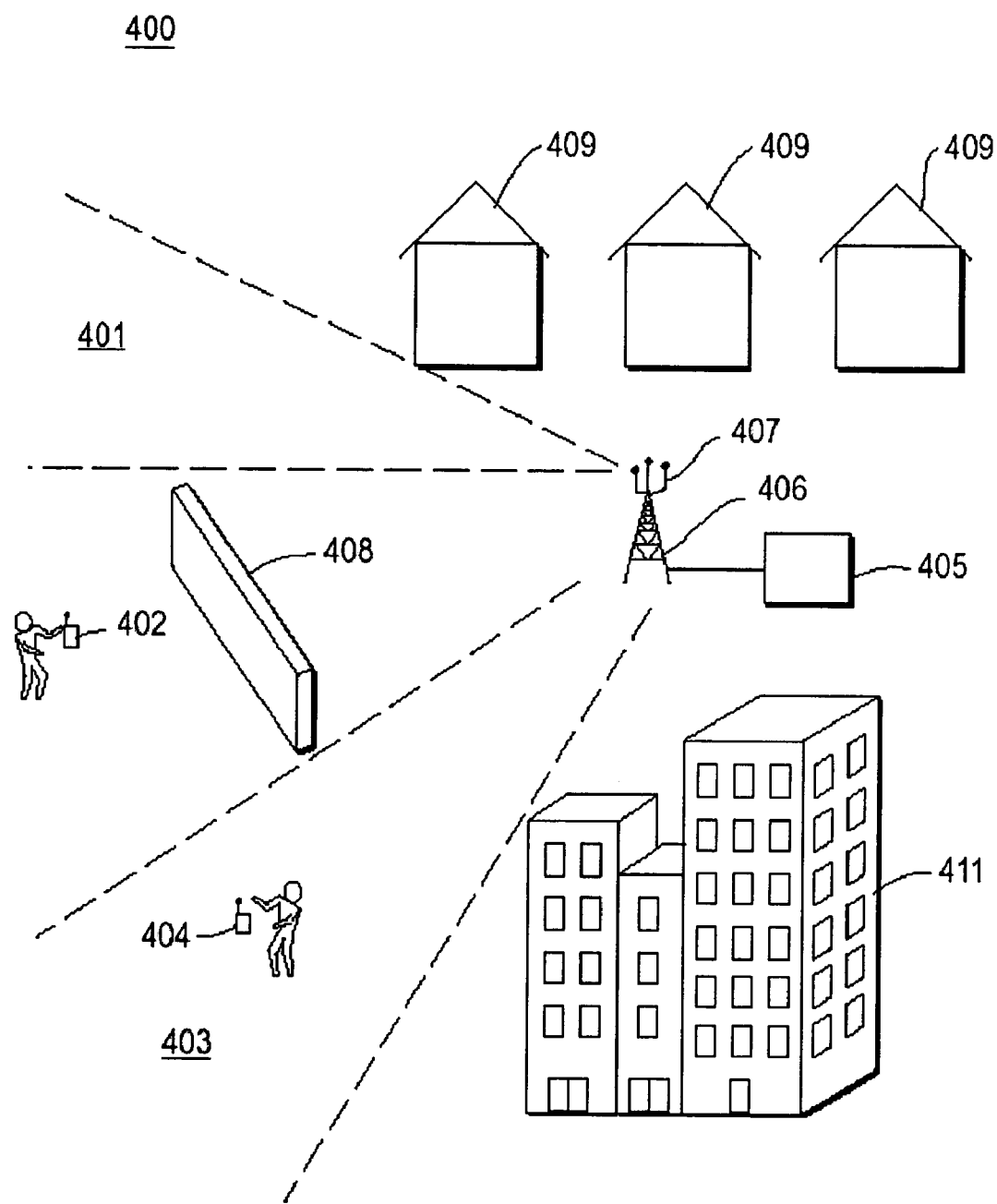
FIG. 3 is a block diagram illustrating two mobile units, a base station, and various obstacles wherein the present invention is advantageously utilized.

Referring to FIG. 3, a wireless communication environment 400 is illustrated with mobile units 402, 404 and a WLAN 405 having at least one base station 406. The mobile units 402, 404 are preferably equipped with a global positioning system (GPS) to enable them to determine their own geographic location.

The base station provides network access in a selected geographic area via an associated antenna system 407. Various obstacles, such as a walls 408, houses 409, and/or office buildings 411 can limit the quality of service QoS provided by the base station. Although obstructed zones can be serviced by the base station 406, power requirements are generally greater in obstructed areas in comparison to unobstructed areas such as zones 401 and 403. The unobstructed areas can be advantageously designated as preferred areas for supporting communications or enhanced communication services to mobile units when located within such areas.

If the mobile unit 402 does not contain a GPS or is not otherwise configured for the determination of its own location, the WLAN 405 determines the mobile unit's estimated position such as by using the various aforementioned triangulation and Doppler techniques. The WLAN 405, for example, determines a relative position of the mobile unit 402 to the antenna 407 of the base station 406 and transmits location informational data to the mobile unit 402 to facilitate moving the mobile unit 402 to the hot spot zones 401 and 403.

Hot spot services can be provided by using beam forming for selected services. For example, the communication beam for reception and transmission by the base station antenna can be configured to cover the hot spot area so that a communication power threshold is not met by a mobile unit attempting to utilize the selected services outside of the hot spot area, even if otherwise within a communication radius of the base station antenna. Alternatively or in conjunction with beam forming, the base station can be configured to only provide enhanced communications for a mobile unit when it is determined that such mobile is physically located in the hot spot area through evaluation of relative geolocation data.

The base station can be configured to provide service within a given communication radius, but to only provide enhanced communications for a mobile unit when it is physically located in the hot spot area. For example, basic paging service could be provided for a 360 degree radius from the antenna 407 of the base station 406, but data transfer, voice, and/or Internet services may only be provided in hot spot zones 401 and 403. In such an example, mobile unit 402 can be paged at its illustrated location, but would need to relocate to hot spot zones 401 or 403 to conduct other types of communications supported by the hot spot wireless communication system 406.

As an alternative, a base station can be configured to provide service within a given communication radius, but to alert a mobile unit when it is not physically located in a hot spot area where power consumption is relatively high. For example, all services could be provided for a 360 degree radius from the antenna 407 of the base station 406, but more energy efficient services may be provided in hot spot zones 401 and 403. In such example, mobile unit 402 can receive a warning at its illustrated location, but would not receive such warning if it relocated to hot spot zones 401 or 403.

The network 405 preferably maintains data relating to the hot spots serviced by each base station 406 that includes relative geographic coverage area data which can take the form of a dynamic table of locations versus throughput based upon recent communications history. This data can then be used in connection with mobile unit geolocation data to provide relocation data to a mobile unit to enable the user to relocate to a hot spot area for utilizing the enhanced services.

The WLAN 405 is preferably configured to receive and respond to hot spot location requests. For example, where base station 406 is configured to provide at least some communication service outside hot spot areas 401, 403, mobile unit 402 transmits a request to access services only available in a hot spot location. Where the request includes mobile unit geolocation data, or the network can otherwise determine an estimate of the requesting mobile unit's location, the network 405 then replies with one or more data sets of hot spot locations which are near the location of the user. The user can then move to one of these locations to access and/or achieve a better quality of service (QoS).

The network 405 can base the information provided to the mobile unit 402 on a determination of which hot spots are within a predetermined threshold distance of the requesting mobile unit. The selection criteria can be dynamically based on network usage to direct mobile units to lesser used hot spots by not providing the location data of hot spots conducting a high volume of communication traffic at the time of the request or by listing the locations based on best available QoS. For example, referring to FIG. 3, hot spot zone 401 only or first followed by hot spot zone 403 could be identified to mobile unit 402, where mobile unit 404 is conducting a communication in hot spot zone 403 and there are no current communications conducted in hot spot zone 401.

As an alternative to specific mobile unit requests, the WLAN 405 can monitor mobile unit location and automatically, without user initiated intervention, advise the user to move to a different location to achieve more efficient throughput. This can be used to maintain an on going communication while alerting the user that an enhanced service area or a more energy efficient location is available. For example, the monitoring of the mobile unit 402 by the WLAN 405 is then configured to provide the mobile unit 402 with real time updated radio signal coverage information as the mobile unit 402 traverses the WLAN coverage area of the base station 406.

The mobile units can be configured with a display with a displayable map function such as the type that are well known with GPS systems. In such case, after the WLAN 405, for example, determines the location of the mobile unit 402, the system 405 downloads map information containing the hot spot coordinates for display as a map image on mobile unit 402. For example, the downloaded information can contain coordinate information concerning hot spot locations 401 and 403 either in the form of an entire map or, if the mobile unit has general map information as coordinates defining an area on the mobile units built in maps.

The hot spots such as locations 401 and 403 can be provided in an earlier download from a network, published in a networking guide, or determined heuristically from previous sojourns through wireless coverage areas served by the base station 406 of the WLAN 405. Where such external or previously stored information is indexed to the specific WLAN 405, the WLAN 405 can convey identification information to the mobile unit 402 that informs it that it is within the service area of the WLAN and the mobile unit can then determine a path and/or direction to the hot spot locations without additional information.

Where a WLAN is configured to provide service only for mobile units that are physically located in the hot spot areas, such external or previously stored resources available to a mobile unit can be used by the mobile unit to locate the service areas. For example, wireless services may only be provided in hot spot zones 401 and 403. In such example, mobile unit 402 would need to relocate to hot spot zones 401 or 403 to conduct other types of communications supported by the hot spot wireless communication system 405.

To relocate, the mobile unit can use external or previously stored information if available. Alternatively, where the WLAN is configured for both network access through hot spots and ad hoc peer-to-peer communications between mobile units, hot spot location requests can be made indirectly to the WLAN. For example, mobile unit 402 could convey a request for hot spot location information to mobile unit 404 located in hot spot zone 403, which in turn relays the request to the WLAN 405, which in turn transmits relocation information via mobile unit 404 to mobile unit 402.

Preferably, the hot spot service zone information is stored within a database in the WLAN 405 and is regularly updated. Dynamic QoS information can be used to maintain a rating of hot spots based on traffic and other parameters, particularly factors related to radio interference. Service zone information can be computationally derived using the network's antenna 407 radiation pattern and/or mapped over time using historical mobile unit signal quality feedback information.

Although beam forming can be, and in some instances is preferably, used to define the hot spot areas, unlike typical beam forming systems that direct beams based on mobile unit location, the wireless communication system of the present invention generally requests mobile units to reposition themselves to the hot spot area at which formed beams are directed. Where beam forming is used to service a defined hot spot area, the beam can be adjusted to account for actual traffic within the hot spot area. For example, a beam formed via antenna 407 from base station 406 may not actually cover the entire area of hot spot zones 401 and 403 at any particular point in time, but rather is adjusted to provide more optimum throughput in providing services in the hot spot area. Potentially, for the very limited instance illustrated in FIG. 3, a beam can be directed to only cover a portion of the hot spot zone 403 to service mobile unit 404 and without any coverage of hot spot zone 401 which is unoccupied. However, in such cases, the WLAN is preferably configured with some type of monitoring of the hot spot zones in their entirety so that an appropriate beam is provided when a mobile unit enters, or is activated within, a hot spot area.

Although the aforementioned discussed WLAN technology employing 802.11 technology, the present invention can be implemented in any wireless communications system, such as a time division duplex (TDD) or frequency division duplex (FDD) wireless telephone system.

What is claimed is:

1. A communication method for a mobile wireless transmit receive unit (mobile WTRU) within a wireless network having geographic areas for preferred communication usage where the mobile WTRU can directly transmit and receive communication signals with a predetermined network station associated with a respective geographic area, comprising the steps of:
   determining an estimated geographic location of a mobile WTRU;
   providing the mobile WTRU with position data relative to the determined mobile WTRU estimated location of at least one preferred communication area associated with a network station with which the WTRU cannot directly communicate at the determined mobile WTRU estimated location;
   displaying the relative position data of said at least one preferred communication area to facilitate relocation of the mobile WTRU from the determined mobile WTRU estimated location to said at least one preferred communication area; and
   relocating the WTRU to within said at least one preferred communication area such that the WTRU directly transmits and receives communication signals with the network station associated with said at least one preferred communication area.

2. The method of claim 1, further comprising the steps of:
   initiating a request for a pre-designated preferred communication area location by the mobile WTRU; and
   receiving the request by a network base station.

3. The method of claim 2, wherein the mobile WTRU is equipped with a global positioning system (GPS), the mobile WTRU estimated location is determined by using the mobile WTRU's global positioning system (GPS), the mobile WTRU request transmission includes current mobile WTRU estimated location data, and the network base station transmits to the mobile WTRU relative position data that is determined by the network based on the current mobile WTRU estimated location data.

4. The method of claim 3, wherein the relative position data transmitted by the network base station to the mobile WTRU is determined by the network, based on the current mobile WTRU estimated location data and dynamic data of preferred communication area usage.

5. The method of claim 2, wherein a current mobile WTRU estimated location is determined by the wireless network analyzing data related to physical properties of the mobile WTRU request transmission and the network base station transmits to the mobile WTRU relative position data that is determined by the network based on the current mobile WTRU estimated location data.

6. The method of claim 5, wherein the relative position data transmitted by the network base station to the mobile WTRU is determined by the network, based on the current mobile WTRU estimated location data and dynamic data of pre-designated preferred communication area usage.

7. The method of claim 2, wherein the mobile WTRU is equipped with a global positioning system (GPS), the mobile WTRU estimated location is determined by using the mobile WTRU's global positioning system (GPS), the network base station transmits to the mobile WTRU geographic location data of all network pre-designated preferred communication areas serviced by the base station, and relative position data is determined by the mobile WTRU.

8. The method of claim 2, wherein the network permits direct mobile WTRU wireless communications with network base stations and also peer-to-peer wireless communications between mobile WTRUs and wherein the request initiated by the mobile WTRU and received by the network base station is relayed via a different mobile WTRU located in a pre-designated preferred communication area serviced by the base station.

9. The method of claim 1, wherein the network monitors determined mobile WTRU estimated locations and relative position data is periodically transmitted to the mobile WTRU that is determined by the network, based on current mobile WTRU estimated location data and dynamic data of network usage.

10. The method of claim 1, wherein the mobile WTRU is equipped with a global positioning system (GPS) and the mobile WTRU estimated location is determined by using the mobile WTRU's global positioning system (GPS).

11. The method of claim 1, wherein relative position data is determined by the network based on the determined mobile WTRU estimated location data and dynamic data of network usage data such that a ranked preference order of preferred communication areas is determined and relative position data at least a first preferred communication area preference is transmitted by a network base station to the mobile WTRU.

12. The method of claim 1, further comprising the steps of:
defining preferred communication areas by respective sets of geographical coordinates;
storing said coordinate sets in a network database; and
selectively transmitting from a network base station one or more of the data sets to provide the mobile WTRU with relative position data.

13. The method of claim 1, wherein the mobile WTRU is equipped with a map display, the method of further comprising the step of using relative position data to display a map of preferred communication areas relative to the estimated mobile WTRU location.

14. A mobile wireless transmit receive unit (mobile WTRU) for communication within a wireless network having geographic areas pre-designated for preferred communication usage where the mobile WTRU can directly transmit and receive communication signals with a predetermined network station associated with a respective geographic area, comprising:
a transmitter that is configured to use a determined mobile WTRU estimated location to initiate a request for a location of at least one pre-designated preferred communication area associated with a network station with which the WTRU cannot directly communicate at the determined mobile WTRU estimated location;
a receiver configured to receive geographic location data corresponding to at least one pre-designated preferred communication area serviced by the network; and
a user output device configured to display relative position data of said at least one preferred communication area relative to the determined mobile WTRU estimated location to facilitate relocation of the mobile WTRU from the determined mobile WTRU estimated location to said at least one preferred communication area such that the WTRU can directly transmit and receive communication signals with the network station associated with said at least one preferred communication area.

15. The mobile WTRU of claim 14, further comprising a global positioning system (GPS) that determines an estimated location of the mobile WTRU, wherein the transmitter is configured to transmit the pre-designated preferred communication location request by transmitting a signal that includes current mobile WTRU estimated location data, and wherein the mobile WTRU receiver is configured to receive geographic location data corresponding to at least one pre-designated preferred communication area in the form of relative position data that is determined by the network based on the transmitted mobile WTRU estimated location data.

16. The mobile WTRU of claim 14, wherein the mobile WTRU receiver is configured to receive geographic location data corresponding to at least one pre-designated preferred communication area in the form of relative position data that is determined by the network, based on a mobile WTRU estimated location determined by the wireless network analyzing data related to physical properties of the mobile WTRU request transmission.

17. The mobile WTRU of claim 14, further comprising a global positioning system (GPS) that determines an estimated location of the mobile WTRU and that calculates relative position data based on geographic location data corresponding to at least one pre-designated preferred communication area serviced by the network received in response to a transmitted request.

18. The mobile WTRU of claim 14, wherein the mobile WTRU is configured for direct communication with network base stations and also peer-to-peer wireless communications with other mobile WTRUs and wherein the mobile WTRU receiver is also configured to receive a response to a transmitted request via a relay from another mobile WTRU in direct communication with a network base station.

19. The mobile WTRU of claim 14, further comprising a map display configured to visually display pre-designated preferred communication areas relative to the estimated mobile WTRU location.

20. The mobile WTRU of claim 14, wherein the mobile WTRU is configured for wireless communication in a wireless local area network (WLAN).

21. The mobile WTRU of claim 14, wherein the mobile WTRU is configured for wireless communication in a time division duplex (TDD) telecommunications system.

22. The mobile WTRU of claim 14, wherein the mobile WTRU is configured for wireless communication in a frequency division duplex (FDD) telecommunications system.

23. The mobile WTRU of claim 14, wherein the user output device comprises a power use indicator that is active when the mobile WTRU is not physically located in a pre-designated preferred communication area and is located in an area where power consumption is relatively high.

* * * * *

UNITED STATES PATENT AND TRADEMARK OFFICE
CERTIFICATE OF CORRECTION

PATENT NO. : 7,231,220 B2 Page 1 of 1
APPLICATION NO. : 10/675638
DATED : June 12, 2007
INVENTOR(S) : Reddy et al.

It is certified that error appears in the above-identified patent and that said Letters Patent is hereby corrected as shown below:

IN THE SPECIFICATION

At column 1, line 61, after "115", delete "and 117" and insert therefor --, 117 and 119--.

At column 3, line 63, after the word "data", insert --of--.

At column 4, line 17, after the word "on", insert --one--.

At column 7, line 26, before the word "built", delete "units", and insert therefor --unit's--.

Signed and Sealed this

Fifteenth Day of July, 2008

JON W. DUDAS
*Director of the United States Patent and Trademark Office*